Sept. 26, 1933. J. M. CRUM 1,927,922
COMBINED AUTOMOBILE TRUNK AND ACCESSORY DRAWER
Filed Nov. 21, 1929 2 Sheets-Sheet 1
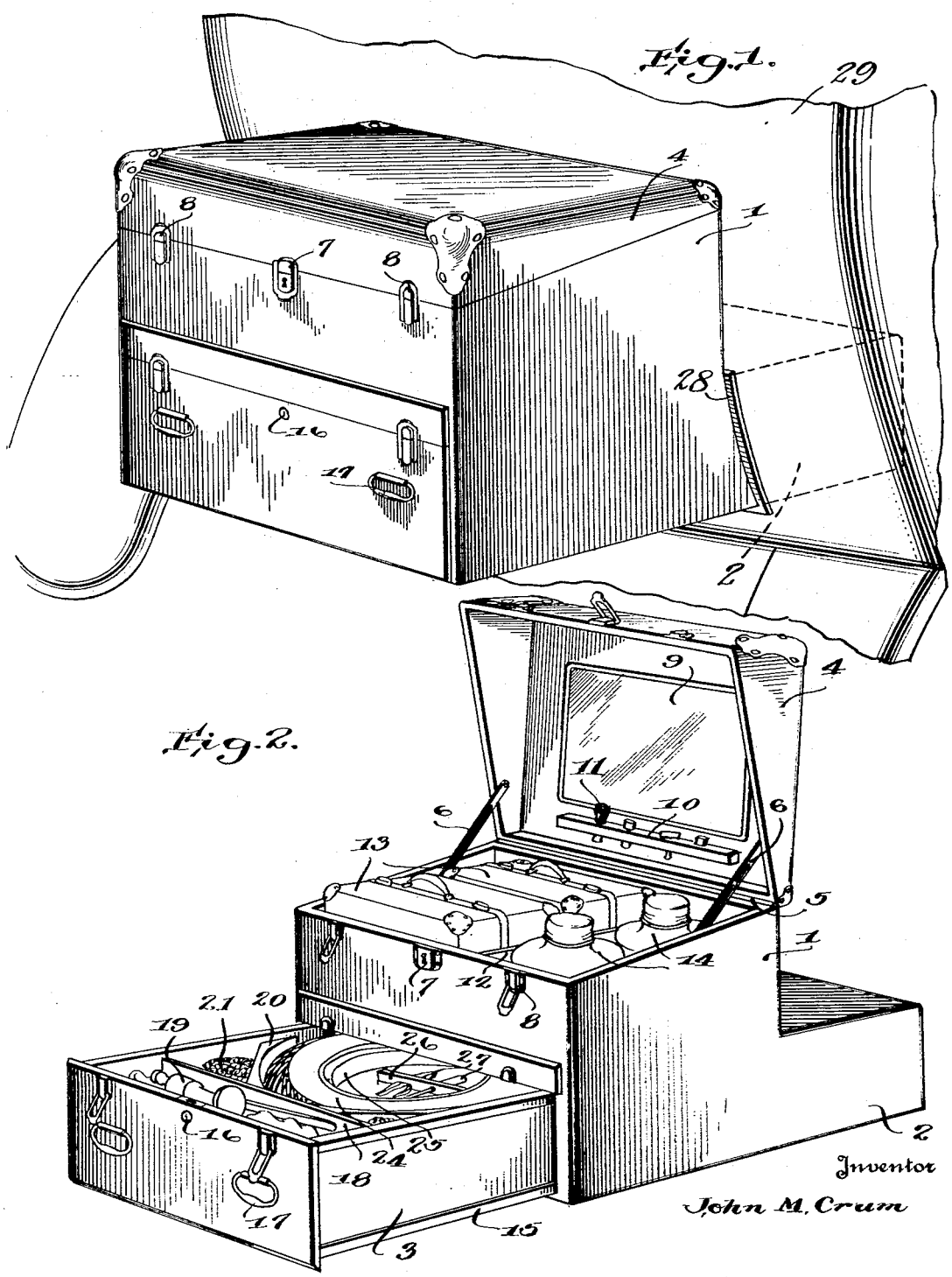

Sept. 26, 1933. J. M. CRUM 1,927,922
COMBINED AUTOMOBILE TRUNK AND ACCESSORY DRAWER
Filed Nov. 21, 1929 2 Sheets-Sheet 2

Inventor
John M. Crum

By Donald L. Maxson
Attorney

Patented Sept. 26, 1933

1,927,922

UNITED STATES PATENT OFFICE 1,927,922

COMBINED AUTOMOBILE TRUNK AND ACCESSORY DRAWER

John M. Crum, Johnstown, Pa.

Application November 21, 1929
Serial No. 408,683

1 Claim. (Cl. 296—37)

This invention relates to improvements in automobile trunks, and more particularly to a combined automobile trunk and accessory drawer which may readily be attached to the rear end of an automobile by inserting a portion of the drawer portion through the back of the automobile and under the rear seat thereof, while the trunk portion is adapted to lie flush with the back at its inner end.

An object of the invention is to provide a combined automobile trunk and accessory drawer which may be attached equally well to the rear of an automobile of the sedan or coach type, and which may be built with only the accessory drawer when it is desired to use the same with an automobile of the roadster type.

Another object of the invention is to provide an improved and combined automobile trunk and accessory drawer which will be arranged to partially extend through the back of an automobile and under the rear seat, to receive traveling cases, thermos bottles, and the drawer portion to receive the spare tire and rim, the tire chains, and other equipment for repairing tires and chains, a separate compartment being provided in the drawer for the jack and tire changing tools.

A still further object of the invention is to provide an improved and combined automobile trunk and accessory drawer, which will be highly efficient in use, and which will be quite inexpensive to manufacture.

Other objects will appear as the description proceeds.

In the accompanying drawings which form a part of my application,

Figure 1 is a perspective view of my combined automobile trunk and accessory drawer;

Figure 2 is a perspective view of my combined automobile trunk and accessory drawer showing the drawer extended and the trunk top raised;

Like characters of reference are used throughout the following specification and the accompanying drawings to designate corresponding parts.

Figure 3:
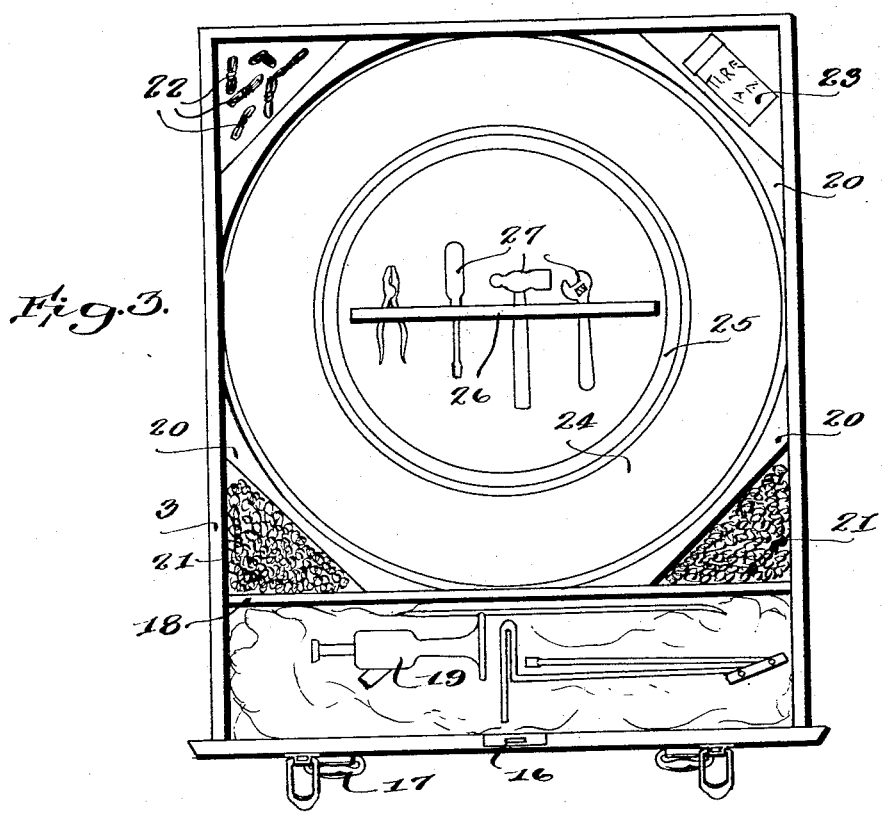
Figure 3 is a plan view of the accessory drawer showing the positioning of the several articles received therein.
Figure 4:
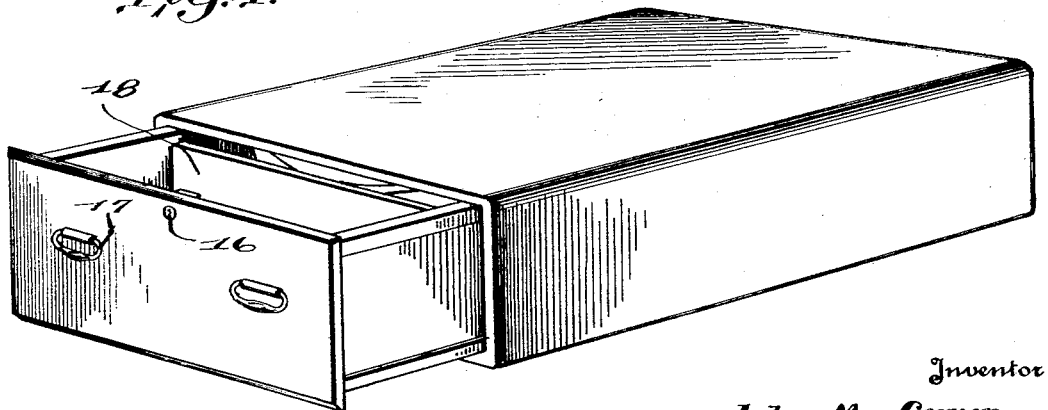
Figure 4 is a perspective view of the accessory drawer and its housing formed without the trunk, and adapted to be used with automobiles of the roadster type.

In carrying out my invention, I provide a combined trunk 1 and accessory drawer portion 2 in which the drawer 3 is adapted to be slidably received, and which parts will be formed as an integral unit.

The trunk 1 will be provided with a top 4 hinged at 5, and is formed with sloping ends which provide for the front of the trunk top being deeper than the back thereof. Braces 6 are connected with the ends of the trunk 1 and the top 4, and provide for holding the top at the desired angle when opened. A suitable lock 7 and fastening snaps 8 are arranged to lock the top to the trunk.

A mirror 9 is placed on the inner wall of the top 4, and a rack 10 for receiving shaving apparatus 11 is disposed below the mirror. The trunk 1 is provided with a slidable and removable partition 12, which separates the traveling bags 13 from the thermos bottles 14, which fit snugly within the trunk.

The accessory drawer 3 is slidably mounted upon the tracks 15, and is adapted to be received within the portion 2, and is provided with a lock 16 and fastening snaps 17. The drawer 3 is further provided with a transverse partition 18 forming a compartment for the reception of the jack 19, while four angularly arranged blocks 20 provide pockets for the tire chains 21, repair links 22 and tire patching equipment 23.

The space between the several blocks 20 is just sufficient to receive a tire 24 and its rim 25, so that there is no need of having the tire extending out beyond the trunk, as is customary. A rack 26 is provided for the tools 27 within the space occupied by the tire and rim, so that the tools and equipment for any repairs or adjustment may be readily accessible.

It will be understood that the combined trunk and accessory drawer is formed so that the extended portion of the drawer housing will extend through the back of the automobile and under the rear seat thereby forming a neat and compact arrangement which will not be unsightly, as is the case when the trunk and one or more tires are placed on carriers behind the trunk. For automobiles of the roadster type, the drawer housing and drawer only may be placed within the rearwardly extending portion of the automobile, thereby providing an efficient and ornamental tire and accessory carrier.

A sealing strip 28 may be secured to the rear vertical edges of the trunk and to the back 29 of the automobile to add to the appearance and to provide a tight joint between the same.

It will be understood that I do not limit myself to any shape or size of the trunk and accessory drawer, as any desired change may be made without departure from the spirit of the invention.

Having thus described my invention what I claim as new and desire to secure by Letters Patent of the United States is:

The combination of an automobile body having an opening cut through the lower vertical portion of its back and a combined unitary housing having an upper luggage receiving portion and a lower accessory drawer receiving portion adapted to extend through the opening in the automobile back and to be secured beneath the rear seat of the automobile with the front wall of the luggage receiving portion lying in a vertical plane substantially parallel with the rear wall of the automobile body and adjacent thereto, the top of the forwardly extending drawer receiving portion being arranged parallel with the top of the housing but lying in a lower plane, means forming a complete seal between the housing and the back of the automobile when the drawer receiving portion is secured in said opening.

JOHN M. CRUM.